(12) United States Patent
Kim et al.

(10) Patent No.: US 11,531,143 B2
(45) Date of Patent: *Dec. 20, 2022

(54) WINDOW COVER FILM AND FLEXIBLE DISPLAY PANEL INCLUDING THE SAME

(71) Applicants: SK Innovation Co., Ltd., Seoul (KR); SK IE Technology Co., Ltd., Seoul (KR)

(72) Inventors: Hye Jin Kim, Daejeon (KR); Min Sang Park, Daejeon (KR); Keon Hyeok Ko, Daejeon (KR)

(73) Assignees: SK Innovation Co., Ltd., Seoul (KR); SK ie technology Co., Ltd., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 17/034,233

(22) Filed: Sep. 28, 2020

(65) Prior Publication Data

US 2021/0096280 A1  Apr. 1, 2021

(30) Foreign Application Priority Data

Sep. 30, 2019 (KR) .................... 10-2019-0120811

(51) Int. Cl.
*G02B 1/14* (2015.01)
*B32B 33/00* (2006.01)

(52) U.S. Cl.
CPC ............... *G02B 1/14* (2015.01); *B32B 33/00* (2013.01); *B32B 2379/00* (2013.01); *Y10T 428/24967* (2015.01)

(58) Field of Classification Search
CPC ........ G02B 1/14; C08G 73/14; C08G 18/588; C08G 77/00–77/80
See application file for complete search history.

(56) References Cited

U.S. PATENT DOCUMENTS

| | | | |
|---|---|---|---|
| 7,604,381 B2 | 10/2009 | Hebrink et al. | |
| 9,132,611 B2 | 9/2015 | Takeuchi | |
| 9,580,555 B2 * | 2/2017 | Ju ........................... | C08G 73/14 |
| 9,706,649 B2 | 7/2017 | Jung et al. | |
| 9,914,811 B2 * | 3/2018 | Song ........................ | C08J 7/046 |
| 10,118,371 B2 | 11/2018 | Kim et al. | |
| 10,591,761 B2 | 3/2020 | Jee et al. | |
| 10,759,966 B1 * | 9/2020 | Kim ......................... | C08G 77/38 |
| 2012/0021234 A1 * | 1/2012 | Fukukawa .............. | B32B 27/34 428/458 |

(Continued)

FOREIGN PATENT DOCUMENTS

| | | | |
|---|---|---|---|
| JP | 2012210780 A | | 11/2012 |
| JP | 2018119133 A | * | 8/2018 |

(Continued)

OTHER PUBLICATIONS

Machine translation of JP2018119133. Retrieved Oct. 22, 2021.*

(Continued)

*Primary Examiner* — Prashant J Khatri
(74) *Attorney, Agent, or Firm* — The Webb Law Firm

(57) ABSTRACT

Provided are a window cover film and a flexible display panel including the same. More preferably, a window cover film including a transparent film and a hard coating layer and a flexible display panel including the same are provided.

12 Claims, 2 Drawing Sheets

(56) References Cited

U.S. PATENT DOCUMENTS

| | | | | |
|---|---|---|---|---|
| 2013/0203937 A1* | 8/2013 | Cho | ............... | C08G 69/42 |
| | | | | 524/600 |
| 2018/0113350 A1* | 4/2018 | Jee | ............... | C08K 5/5419 |
| 2018/0142127 A1* | 5/2018 | Park | ............... | C08G 59/3281 |
| 2019/0077960 A1 | 3/2019 | Kim et al. | | |
| 2019/0134963 A1 | 5/2019 | Hara et al. | | |
| 2019/0153161 A1 | 5/2019 | Ryu et al. | | |
| 2020/0142102 A1* | 5/2020 | Kikuchi | ............... | C09D 183/06 |

FOREIGN PATENT DOCUMENTS

| | | | | |
|---|---|---|---|---|
| KR | 920002156 | B1 | 3/1992 | |
| KR | 20100016372 | A | 2/2010 | |
| KR | 20120079127 | A | 7/2012 | |
| KR | 20130074167 | A | 7/2013 | |
| KR | 1020130074167 | A | 7/2013 | |
| KR | 1020160055655 | A | 5/2016 | |
| KR | 1020170016297 | A | 2/2017 | |
| KR | 1020170136285 | A | 12/2017 | |
| KR | 20180018306 | A | 2/2018 | |
| KR | 20180018307 | A | 2/2018 | |
| KR | 1020180018307 | A | 2/2018 | |
| KR | 101839293 | B1 | 3/2018 | |
| KR | 20180044216 | A | 5/2018 | |
| KR | 20180071943 | A | 6/2018 | |
| KR | 20190026611 | A | 3/2019 | |
| KR | 20190029110 | A | 3/2019 | |
| KR | 1020190098679 | A | 8/2019 | |
| WO | 2017188174 | A1 | 11/2017 | |
| WO | WO-2018207914 | A1 * | 11/2018 | ........... C09D 183/04 |

OTHER PUBLICATIONS

"Terephthaloyl chloride | C8H4CI2O2—PubChem". https://pubchem.ncbi.nlm.nih.gov/compound/Terephthaloyl-chloride; Retrieved Oct. 22, 2021.*

Kim et al., "Transparent Urethane Siloxane Hybrid Material for Flexible Cover window with Ceramic-like Strength, yet Polymer-like Modulus", ACS Applied Materials & Interfaces, 2018, 30 pages.

Lee et al., "Measurement of Flexural Modulus of Lamination Layers on Flexible Substrates", Journal of the Microelectronic Packaging Society, 2016, pp. 63-67, vol. 23, No. 3.

"Measurement method of physical properties—Measurement method of flexural property", R&F Chemical, retrieved from http://rnfchemical.com/rnd/reference-2/?pageid=18&uid=769&mod=document.

\* cited by examiner

WINDOW COVER FILM AND FLEXIBLE DISPLAY PANEL INCLUDING THE SAME

CROSS-REFERENCE TO RELATED APPLICATION

This application claims priority to Korean Patent Application No. 10-2019-0120811 filed Sep. 30, 2019, the disclosure of which is hereby incorporated by reference in its entirety.

TECHNICAL FIELD

The following disclosure relates to a window cover film and a flexible display panel including the same.

BACKGROUND

A thin display such as a liquid crystal display or an organic light emitting diode display is implemented in the form of a touch screen panel and is widely used in various smart devices characterized by portability including various wearable devices as well as smart phones and tablet PCs.

These portable touch screen panel-based displays are provided with a window cover for display protection on a display panel for protecting a display panel from external impact, and in recent years, as a foldable display device having flexibility to be folded and unfolded has been developed, a glass film as the window cover is replaced with a plastic film.

As the base material of the window cover film, polyethylene terephthalate (PET), polyether sulfone (PES), polyethylene naphthalate (PEN), polyacrylate (PAR), polycarbonate (PC), polyimide (PI), polyaramid (PA), polyamideimide (PAI), and the like, which are flexible and have transparency are used.

Besides, recently, required performance for flexibility is increasingly advanced, for example, various smart devices require flexibility and pliability and even require foldable properties so that they are folded.

However, until now, like the foldable display device, strict conditions of having no minor flaw due to folding while having a characteristic of satisfying high mechanical strength, optical properties, yellowness, and mechanical physical properties are required for a window cover film used in a display device requiring excessive flexible properties. In addition, since a general dynamic bending test proceeds, even though a bend fold is invisible to the naked eye, fine cracks which are invisible to the naked eye due to microbending failure may occur. In this case, the film will eventually fail the bending test by subtle but periodic force when uneven pressure is applied. Therefore, a film having no fine cracks (<200 um) even in microbending is needed.

For example, since the film may withstand mechanical stress and have no crease on the folding area even during long-term use without changing optical physical properties only when a micro flexural modulus and a micro flexural strength are excellent and fine cracks do not occur in repeated folding tests corresponding to a usual display life even in microfolding properties, development of a window cover film satisfying the properties is currently needed.

In particular, development of a window substrate for protection for being applied to a sufficiently flexible display, which has a high bending strength, has no crease due to contraction and elongation by folding in spite of having such a high bending strength, and is sufficiently flexible, is currently further needed.

RELATED ART DOCUMENTS

Patent Documents (Patent Document 1) Korean Patent Laid-Open Publication No. 10-2013-0074167 (Jul. 4, 2013)

SUMMARY

An embodiment of the present invention is directed to providing a window cover film having improved durability and mechanical properties. A polyimide-based film for a window cover having improved mechanical properties, which has a characteristic of having excellent strength of preferably a micro flexural modulus of 15 GPa or more and a micro flexural strength of 200 MPa or more, and more preferably a micro flexural modulus of 20 GPa or more and a micro flexural strength of 250 MPa or more, is intended to be provided.

Another embodiment of the present invention is directed to providing a novel window cover film which has no crease even with expansion and contraction inside and outside by folding.

Specifically, a window cover film, which has no cracks even when bending is repeated 30,000 times or more, more preferably 100,000 times, and still more preferably 200,000 times and may be applied to a surface of a display and the like having a curved shape, is intended to be provided.

Still another embodiment of the present invention is directed to providing a flexible display panel having improved durability and mechanical properties.

In one general aspect, a window cover film includes a transparent film and a hard coating layer formed on one surface of the transparent film, wherein the window cover film has a micro flexural modulus of 15 to 40 GPa and a micro flexural strength of 200 MPa or more. Here, the micro flexural modulus and the micro flexural strength refer to a modulus of elasticity and a strength measured as follows: a film having a width of 10 mm, a length of 20 mm, and a thickness of 20 to 100 μm is placed between a lower anvil and an upper anvil of a micro 3-point bend fixture including two lower anvils spaced at an interval of 4 mm and one upper anvil having a radius of 0.25 mm, a preload of 0.2 N is applied at a rate of 1 mm/min using a load cell of 50 N, and then the film is pressed at a rate of 1 mm/min until a flexural strain of 2% is achieved, the modulus of elasticity and the strength being measured from a stress applied thereto.

In an exemplary embodiment of the present invention, the window cover film may satisfy the following Relation 1:

$$2 \leq |Mh-Mf| \leq 15 \qquad \text{[Relation 1]}$$

wherein Mh is a micro flexural modulus measured when a hard coating layer surface faces upward, and Mf is a micro flexural modulus measured when a transparent film surface faces upward.

In an exemplary embodiment of the present invention, the window cover film may satisfy the following Relation 2:

$$20 \leq |Sh-Sf| \leq 150 \qquad \text{[Relation 2]}$$

wherein Sh is a micro flexural strength measured when a hard coating layer surface faces upward, and Sf is a micro flexural strength measured when a transparent film surface faces upward.

In an exemplary embodiment of the present invention, the window cover film may have a flexural displacement of 0.5 to 0.7 mm. Here, the flexural displacement refers to a displacement measured when a flexural strain of 2% is achieved.

In an exemplary embodiment of the present invention, the window cover film may satisfy the following Relation:

$$0.6 < A/B < 0.9$$

wherein A is a flexural stress value (MPa) when a flexural strain is 1%, and B is a flexural stress value (MPa) when a flexural strain is 2%.

In an exemplary embodiment of the present invention, the window cover film may have a light transmittance of 3% or more as measured at 388 nm according to ASTM D1746, a total light transmittance of 87% or more as measured at 400 to 700nm, a haze according to ASTM D1003 of 1.5% or less, a yellowness according to ASTM E313 of 4.0 or less, and a b value of 2.0 or less.

In an exemplary embodiment of the present invention, the transparent film may be a polyimide-based film.

In an exemplary embodiment of the present invention, the polyimide-based film may have a polyamideimide structure.

In an exemplary embodiment of the present invention, the polyimide-based film may include a unit derived from a fluorine-based aromatic diamine, a unit derived from an aromatic dianhydride, and a unit derived from an aromatic diacid dichloride.

In an exemplary embodiment of the present invention, the polyimide film may further include a unit derived from a cycloaliphatic dianhydride. That is, the polyimide-based film may include a unit derived from a cycloaliphatic dianhydride, a unit derived from a fluorine-based aromatic diamine, a unit derived from an aromatic dianhydride, and a unit derived from an aromatic diacid dichloride.

In an exemplary embodiment of the present invention, the polyimide-based film may have an elongation at break according to ASTM D882 of 8% or more.

In an exemplary embodiment of the present invention, the polyimide-based film may have a light transmittance of 3% or more as measured at 388 nm according to ASTM D1746, a total light transmittance of 87% or more as measured at 400 to 700nm, a haze of 2.0% or less, a yellowness of 5.0 or less, and a b* value of 2.0 or less.

In an exemplary embodiment of the present invention, the transparent film may have a thickness of 10 to 500 μm and the hard coating layer may have a thickness of 1 to 50 μm.

In an exemplary embodiment of the present invention, the hard coating layer may include an alicyclic epoxidized silsesquioxane-based compound.

In an exemplary embodiment of the present invention, the hard coating layer may have a pencil hardness of 4H or more.

In another general aspect, a flexible display panel includes the window cover film according to the embodiment.

Other features and aspects will be apparent from the following detailed description, the drawings, and the claims.

DETAILED DESCRIPTION OF EMBODIMENTS

Figure 1:
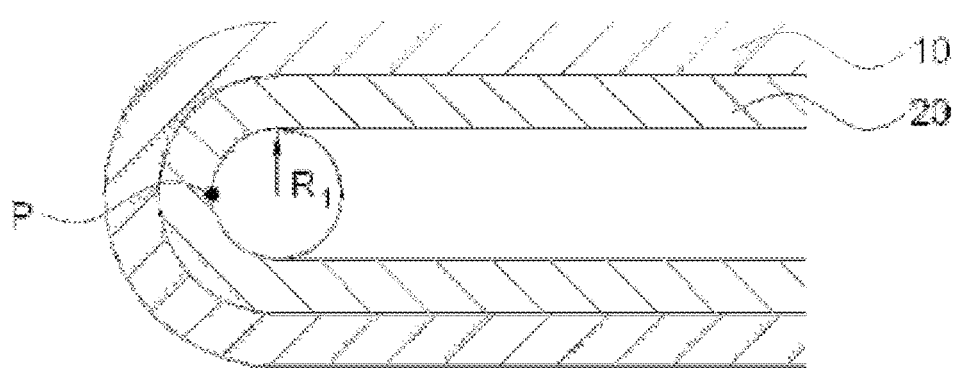
FIGS. 1 and 2 are drawings illustrating a method of measuring dynamic bending properties of a window cover film according to an exemplary embodiment of the present invention.

Hereinafter, the present invention will be described in more detail with reference to specific examples and exemplary embodiments including the accompanying drawings. However, the following specific examples or exemplary embodiments are only a reference for describing the present invention in detail, and the present invention is not limited thereto, and may be implemented in various forms.

In addition, unless otherwise defined, all technical terms and scientific terms have the same meanings as those commonly understood by a person skilled in the art to which the present invention pertains. The terms used in the description of the present invention are only for effectively describing a certain specific example, and are not intended to limit the present invention.

In addition, the singular form used in the specification and claims appended thereto may be intended to also include a plural form, unless otherwise indicated in the context.

In addition, unless particularly described to the contrary, "comprising" any elements will be understood to imply further inclusion of other elements rather than the exclusion of any other elements.

In the present invention, a polyimide-based resin is used as a term including polyimide or polyamideimide. A polyimide-based film is used likewise.

In the present invention, a "polyimide-based resin solution" is used in the same meaning as a "composition for forming a polyimide-based film" and a "polyamideimide solution". In addition, a polyimide-based resin and a solvent may be included for forming the polyimide-based film.

In the present invention, a "film" is obtained by applying and drying the "polyimide-based resin solution" on a support and carrying out peeling off, and may be stretched or unstretched.

In the present invention, "dynamic bending properties" may mean that even when a film is repeatedly deformed (for example, folded and unfolded), permanent deformation and/or damage does/do not occur in a deformed part (for example, a folded part).

The inventors of the present invention conducted many studies in order to solve the above problems, and as a result, found that a window cover film, which satisfies both physical properties of a micro flexural modulus of 15 GPa or more and a micro flexural strength of 200 MPa or more, has greatly improved mechanical strength, flexibility, and dynamic bending properties to prevent cracking and creasing in spite of repeated occurrence of predetermined deformation and is appropriate for being used as a window cover film of a flexible display, thereby completing the present invention.

In addition, in the present invention, it was found that in order to satisfy the micro flexural modulus and the micro flexural strength, a polyimide-based film using a polyimide-based resin which includes a specific monomer composition including a polyimide-based resin including a fluorine atom and an aliphatic cyclic ring structure, more preferably a polyamideimide resin which includes a specific monomer composition including a fluorine atom and an aliphatic cyclic ring structure and is prepared by the preparation method of the present invention in which an amine terminal polyamide oligomer having a polyamide repeating unit is prepared and the oligomer is reacted with a dianhydride, is used and a hard coating layer having a specific composition is formed thereon, thereby greatly improving mechanical strength, flexibility, and dynamic bending properties to prevent cracking in spite of repeated occurrence of predetermined deformation, of the entire window cover film, and thus, the present invention is completed.

The fact that the dynamic bending properties are excellent or improved may mean that even when a film is repeatedly deformed, specifically, repeatedly folded and unfolded, deformation does not occur, and as an example, cracks do not occur.

Specifically, the dynamic bending may mean that cracks do not occur in the dynamic bending of 30,000 times or more, preferably 100,000 times or more, more preferably 150,000 times or more, and still more preferably 200,000 times or more, when measuring the dynamic bending using a measuring device by the measurement method of the present invention. The crack may mean a fine crack.

The crack may be a fine crack, for example, a fine crack having a width of 0.5 μm or more and a length of 10 μm or more and may be a micro-fine crack which may be observed by a microscope rather than the naked eye. When the film satisfies the micro flexural modulus, the micro flexural strength, and the dynamic bending properties, the film may be applied to a window cover film, and more preferably, may be applied to a foldable window cover film.

In addition, the window cover film of the present invention is a thin film having a thickness of 10 to 500 μm, and as such, when a flexural modulus and a bending strength of a micrometer-thick film are measured by a method such as a method according to ASTM D790 which is a method of measuring the flexural modulus and the bending strength of a general plastic product, the correct values thereof may not be measured.

Thus, the inventors of the present invention measured a stress and a bending strength applied to a thin film having a micrometer thickness when fine flexural strain occurs thereon, using the following specific measuring equipment for measuring the properties.

That is, in the present invention, the micro flexural modulus and the micro flexural strength are measured using a micro 3-point bend fixture including two lower anvils spaced at an interval of 4 mm and one upper anvil having a radius of 0.25 mm, as follows: a film having a width of 10 mm, a length of 20 mm, and a thickness of 20 to 100 μm is placed between the lower anvil and the upper anvil, a preload of 0.2 N is applied at a rate of 1 mm/min using a load cell of 50 N, and the film is pressed at a rate of 1 mm/min until a flexural strain of 2% is achieved, the micro flexural modulus and the micro flexural strength being measured from a stress applied thereto.

More specifically, a micro 3-point bend fixture (Instron, CAT. #2810-411) was used for measuring a bending strength due to fine deformation of a thin film. A sample is placed on two lower anvils and then a load is applied to one upper anvil. Here, the used anvil has a radius of 0.25 mm. The loading is applied precisely to a span center between the two lower anvils. In an experiment, a supported span of the lower anvil is 4 mm. Here, the size of the sample is prepared to have a width of 10 mm and a length of 20 mm. A test is performed by mounting a static load cell (CAT #2530-50N) of 50 N on a single column tabletop testing system (CAT #5942) from Instron, applying a preload of 0.2 N at a rate of 1 mm/min, and then pressing at a rate of 1 mm/min until a flexural strain of 2% is achieved. A pressed circular cross section has a diameter of 3 mm. An exact flexural displacement is precisely measured using Advanced Video Extensometer 2 (AVE 2, CAT #2663-901) from Instron. AVE 2 tracks deformation of the part indicated in the sample using a built-in camera in a non-contacting optical extensometer. Finally, a stress applied until a flexural strain of 2% is achieved is measured in 100 ms increments to determine the micro flexural strength and the micro flexural modulus (@ 2% strain). The micro flexural modulus, strength, and strain are values calculated based on an input program in Testing System from Instron.

The window cover film according to an exemplary embodiment of the present invention is characterized by having the micro flexural modulus in a range of 15 GPa or more, specifically 15 to 40 GPa and the micro flexural strength in a range of 200 MPa or more, when measuring the physical properties as described above. Preferably, the micro flexural modulus may be 20 GPa or more, and more preferably 25 GPa or more. In addition, the micro flexural strength may be preferably 250 MPa or more, more preferably 300 MPa or more. More preferably, the micro flexural strength may be 200 to 700 MPa.

In addition, the micro flexural modulus may satisfy the following Relation 1, and the micro flexural strength may satisfy the following Relation 2:

$$2 \leq |Mh-Mf| \leq 15 \quad \text{[Relation 1]}$$

wherein Mh is a micro flexural modulus measured when a hard coating layer surface faces upward, and Mf is a micro flexural modulus measured when a transparent film surface faces upward;

$$20 \leq |Sh-Sf| 150 \quad \text{[Relation 2]}$$

wherein Sh is a micro flexural strength measured when a hard coating layer surface faces upward, and Sf is a micro flexural strength measured when a transparent film surface faces upward.

Within the range satisfying Relations 1 and 2, the bending properties of the polyimide-based film itself are excellent and may be further complemented by adding a coating layer, and the bending properties required for the flexible window cover may be satisfied within the range.

The window cover film according to an exemplary embodiment of the present invention may have the flexural displacement of 0.5 to 0.7 mm (wherein the flexural displacement means a displacement measured when a flexural strain of 2% is achieved). When measured at the flexural strain in a range of 2%, the micro flexural modulus and the micro flexural strength which are reproducible and reliable for fine deformation may be obtained.

The window cover film according to an exemplary embodiment of the present invention may satisfy a relation of 0.6<A/B<0.9 (wherein A is a flexural stress value (MPa) when a flexural strain is 1%, and B is a flexural stress value (MPa) when a flexural strain is 2%). Within the range satisfying the relation, elastic properties are strong to show excellent micro flexural properties, and within the range, the bending properties required for the flexible window cover may be satisfied.

The window cover film according to an exemplary embodiment of the present invention may have no cracks in the dynamic bending of 30,000 times or more, preferably 100,000 times or more, more preferably 150,000 times or more, more preferably 180,000 times or more, and still more preferably 200,000 times or more when measuring the dynamic bending properties. Specifically, the fact that the dynamic bending properties are excellent or improved may mean that even when the window cover film is repeatedly deformed, specifically, repeatedly folded and unfolded, deformation does not occur, and as an example, cracks do not occur.

The crack may mean a fine crack. The term "fine crack" used in the present specification may mean a crack having a size which is usually not observed by the naked eye. The fine crack may mean a crack having a width of 0.5 μm or more and a length of 10 μm or more, and may be observed by a microscope.

Figure 2:
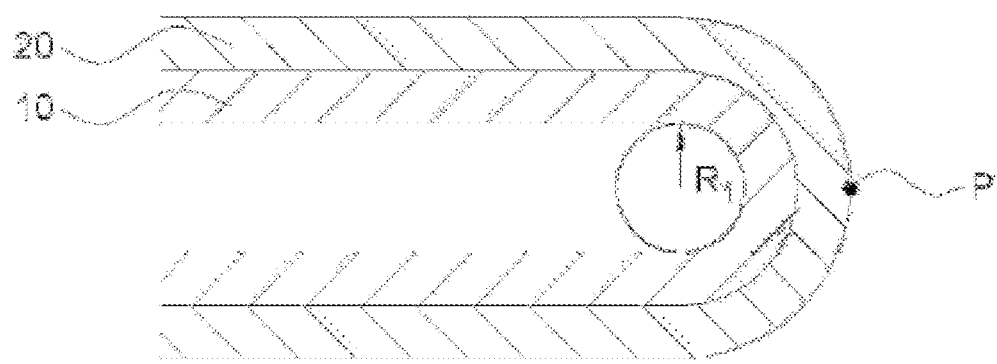

FIGS. 1 and 2 are drawings illustrating a method of measuring the dynamic bending properties of a window cover film 100 according to an exemplary embodiment. As shown in FIG. 1, an operation of winding one surface of the window cover film, for example, a surface on which a hard coating layer 20 is formed around a cylinder having a radius ($R_1$) of 5 mm to fold the surface is repeatedly performed at a rate of 60 cycles/min, and as shown in FIG. 2, the same operation is repeatedly performed on an opposite surface, that is, a surface of a transparent film 10 at a rate of 60 cycles/min, so that the surface is folded at the same position (P), thereby measuring the dynamic bending properties.

Generally, a flexible display device such as foldable instrumentation involves repeated deformation (folding) in use. When the fine cracks occur in deformation, the number of fine cracks is increased as deformation is repeated. Accordingly, fine cracks may gather to form visually recognized cracks. In addition, as the number of cracks is increased, the flexibility of the flexible display device may be decreased to cause fracture in additional folding, and moisture and the like may penetrate into the cracks to decrease durability of the flexible display device.

The window cover film according to exemplary embodiments of the present invention may substantially prevent occurrence of the fine cracks to secure the durability and long-term life of the display device.

In an exemplary embodiment of the present invention, the window cover film may include a transparent film and a hard coating layer on one surface or both surfaces of the transparent film.

In addition, in an exemplary embodiment of the present invention, each layer may be laminated directly in contact with each other, and another layer may be interposed between each layer.

Hereinafter, the transparent film forming the window cover film according to an exemplary embodiment and the hard coating layer formed on the surface of the transparent film will be described.

<Transparent Film>

In an exemplary embodiment of the present invention, the transparent film (also referred to as a substrate layer) may have a thickness of 10 to 500 μm, 20 to 250 μm, or 30 to 110 μm.

In an exemplary embodiment of the present invention, the transparent film may have an elongation at break according to ASTM D882 of 8% or more, 12% or more, or 15% or more, a light transmittance of 3% or more or 5 to 80% as measured at 388 nm according to ASTM D1746, a total light transmittance of 87% or more, 88% or more, or 89% or more as measured at 400 to 700 nm, a haze according to ASTM D1003 of 2.0% or less, 1.5% or less, or 1.0% or less, a yellowness according to ASTM E313 of 5.0 or less, 3.0 or less, or 0.4 to 3.0, and a value of 2.0 or less, 1.3 or less, or 0.4 to 1.3.

In an exemplary embodiment of the present invention, the transparent film has excellent optical physical properties and mechanical physical properties, and may be formed of a material having elasticity and restoring force. Specifically, for example, polyethylene terephthalate (PET), polyether sulfone (PES), polyethylene naphthalate (PEN), polyacrylate (PAR), polycarbonate (PC), polyimide (PI), polyaramid (PA), polyamideimide (PAI), and the like may be used.

More preferably, the transparent film is a polyimide-based resin, and for example, may be a polyimide-based resin having a polyamideimide structure.

In addition, more preferably, the transparent film may be a polyamideimide-based resin including a fluorine atom and an aliphatic cyclic structure, and thus, may have a characteristic of excellent appearance quality, mechanical physical properties, and dynamic bending properties, while satisfying the micro flexural modulus in a range of 15 GPa or more and the micro flexural strength in a range of 200 MPa or more.

In an exemplary embodiment of the present invention, as an example of the polyamideimide-based resin including a fluorine atom and an aliphatic cyclic structure, a polyamideimide polymer prepared by preparing an amine-terminal polyamide oligomer derived from a first fluorine-based aromatic diamine and an aromatic diacid dianhydride and polymerizing a monomer derived from the amine-terminal polyamide oligomer, a second fluorine-based aromatic diamine, an aromatic dianhydride, and a cycloaliphatic dianhydride, is preferred, since it achieves the object of the present invention better. The first fluorine-based aromatic diamine and the second fluorine-based aromatic diamine may be the same or different kinds.

In an exemplary embodiment of the present invention, when the amine-terminal oligomer having an amide structure in a polymer chain by the aromatic diacid dichloride is included as the monomer of the diamine, mechanical strength including the micro flexural modulus may be improved as well as the optical physical properties are improved, and also the dynamic bending properties may be further improved.

In an exemplary embodiment of the present invention, when the polyamide oligomer block is included, a mole ratio between a diamine monomer including the amine-terminal polyoligomer and the second fluorine-based aromatic diamine and a dianhydride monomer including the aromatic dianhydride and the cycloaliphatic dianhydride of the present invention may be 1:0.9 to 1.1, preferably 1:1. In addition, a content of the amine-terminal polyamide oligomer with respect to the entire diamine monomer is not particularly limited, but 30 mol % or more, preferably 50 mol % or more, and more preferably 70 mol % or more are more preferred for satisfying the mechanical physical properties, the yellowness, and the optical properties of the present invention. In addition, a composition ratio of the aromatic dianhydride and the cycloaliphatic dianhydride is not particularly limited; however, a ratio of 30 to 80 mol %:70 to 20 mol % is preferred considering the transparency, the yellowness, and the mechanical physical properties of the present invention, but the ratio is not necessarily limited thereto.

In an exemplary embodiment of the present invention, as the polyamideimide-based resin, a quaternary copolymer including all of a unit derived from a fluorine-based aromatic diamine, a unit derived from an aromatic dianhydride, a unit derived from a cycloaliphatic dianhydride, and a unit derived from an aromatic diacid dichloride is used, thereby satisfying appearance quality and optical properties to be desired, which is thus more preferred.

In addition, in the present invention, another example of the polyamideimide-based resin including a fluorine atom and an aliphatic cyclic structure may be a polyamideimide-based resin obtained by mixing, polymerizing, and imidizing the fluorine-based aromatic diamine, the aromatic dianhydride, the cycloaliphatic dianhydride, and the aromatic diacid dichloride. The resin has a random copolymer structure, may include a content of the aromatic diacid dichloride of 40 mol or more, preferably 50 to 80 mol, a content of the aromatic dianhydride of 10 to 50 mol, and a content of the cycloaliphatic dianhydride of 10 to 60 mol, and may be prepared by polymerization at a mole ratio of a sum of a diacid chloride and a dihydrate to the diamine monomer of 1:0.8 to 1.1. Preferably, polymerization is performed at a mole ratio of 1:1. The random polyamideimide of the present invention is somewhat different in the optical properties such as transparency and mechanical physical properties as compared with the block polyamideimide resin, but may belong to the range of the present invention.

In an exemplary embodiment of the present invention, as the fluorine-based aromatic diamine component, 2,2'-bis (trifluoromethyl)-benzidine and another known aromatic diamine component may be mixed and used, but 2,2'-bis (trifluoromethyl)-benzidine may be used alone. By using the fluorine-based aromatic diamine as such, excellent optical properties may be improved, based on the mechanical physical properties required in the present invention, and the yellowness may be improved, as the polyamideimide-based film. In addition, the micro flexural modulus of the polyamideimide-based film may be improved to improve the mechanical strength of the hard coating layer and further improve the dynamic bending properties.

As the aromatic dianhydride, at least one or two or more of 4,4'-hexafluoroisopropylidene diphthalic anhydride (6FDA) and biphenyltetracarboxylic dianhydride (BPDA), oxydiphthalic dianhydride (ODPA), sulfonyl diphthalic anhydride (SO2DPA), (isopropylidenediphenoxy) bis(phthalic anhydride)(6HDBA), 4-(2,5-dioxotetrahydrofuran-3-yl)-1,2,3,4-tetrahydronaphthalene-1,2-dicarboxylic dianhydride (TDA), 1,2,4,5-benzene tetracarboxylic dianhydride (PMDA), benzophenone tetracarboxylic dianhydride (BTDA), bis(carboxylphenyl) dimethyl silane dianhydride (SiDA), and bis(dicarboxyphenoxy) diphenyl sulfide dianhydride (BDSDA) may be used, but the present invention is not limited thereto.

As an example of the cycloaliphatic dianhydride, any one or a mixture of two or more selected from the group consisting of 1,2,3,4-cyclobutanetetracarboxylic dianhydride (CBDA), 5-(2,5-dioxotetrahydrofuryl)-3-methylcyclohexene-1,2-dicarboxylic dianhydride (DOCDA), bicyclo [2.2.2]oct-7-en-2,3,5,6-tetracarboxylic dianhydride (BTA), bicyclootene-2,3,5,6-tetracarboxylic dianhydride (BODA), 1,2,3,4-cyclopentanetetracarboxylic dianhydride (CPDA), 1,2,4,5-cyclohexanetetracarboxylic dianhydride (CHDA), 1,2,4-tricarboxy-3-methylcarboxycyclopentane dianhydride (TMDA), 1,2,3,4-tetracarboxycyclopentane dianhydride (TCDA), and derivatives thereof may be used.

In an exemplary embodiment of the present invention, when the amide structure is formed in the polymer chain by the aromatic diacid dichloride, mechanical strength including the micro flexural modulus may be greatly improved as well as the optical physical properties are improved, and also the dynamic bending properties may be further improved.

As the aromatic diacid dichloride, a mixture of two or more selected from the group consisting of isophthaloyl dichloride (IPC), terephthaloyl dichloride (TPC), [1,1'-Biphenyl]-4,4'-dicarbonyl dichloride (BPC), 1,4-naphthalene dicarboxylic dichloride (NPC), 2,6-naphthalene dicarboxylic dichloride (NTC), 1,5-naphthalene dicarboxylic dichloride (NEC), and derivatives thereof may be used, but is not limited thereto.

In the present invention, a weight average molecular weight of the polyimide resin is not particularly limited, but may be 200,000 g/mol or more, preferably 300,000 g/mol or more, and more preferably 200,000 to 500,000 g/mol. In addition, a glass transition temperature is not limited, but may be 300 to 400° C., more specifically 330 to 380° C. Within the range, since a film having a high modulus, an excellent mechanical strength, excellent optical physical properties, and less creasing may be provided, the range is preferred, but the present invention is not necessarily limited thereto.

Hereinafter, a method of preparing the polyimide-based film will be illustrated.

In an exemplary embodiment of the present invention, the polyimide-based film may be prepared by applying a "polyimide-based resin solution" including a polyimide-based resin and a solvent on a substrate, and performing drying or drying and stretching. That is, the polyimide-based film may be prepared by a solution casting method.

As an example, the polyimide-based film may be prepared by including: reacting a fluorine-based aromatic diamine and an aromatic diacid dichloride to prepare an oligomer, reacting the prepared oligomer with the fluorine-based aromatic diamine, an aromatic dianhydride, and a cycloaliphatic dianhydride to prepare a polyamic acid solution, imidizing the polyamic acid solution to prepare a polyamideimide resin, and applying a polyamideimide solution in which a polyamideimide resin is dissolved in an organic solvent to form a film.

Hereinafter, each step will be described in more detail, taking a case in which a block polyamideimide film is prepared as an example.

The step of preparing an oligomer may include reacting the fluorine-based aromatic diamine and the aromatic diacid dichloride and purifying and drying the obtained oligomer. In this case, the fluorine-based aromatic diamine may be introduced at a mole ratio of 1.01 to 2 with respect to the aromatic diacid dichloride to prepare an amine-terminal polyamide oligomer monomer. A molecular weight of the oligomer monomer is not particularly limited, but for example, when the weight average molecular weight is in a range of 1000 to 3000 g/mol, better physical properties may be obtained.

In addition, it is preferred to use an aromatic carbonyl halide monomer such as terephthaloyl chloride or isophthaloyl chloride, not terephthalic ester or terephthalic acid itself for introducing an amide structure, and this is, though not clear, considered to influence the physical properties of the film by a chlorine element.

Next, the step of preparing a polyamic acid may be performed by a solution polymerization reaction in which the prepared oligomer with the fluorine-based aromatic diamine, the aromatic dianhydride, and the cycloaliphatic dianhydride are reacted in an organic solvent. Here, the organic solvent used for the polymerization reaction may be, as an example, any one or two or more polar solvents selected from dimethylacetamide (DMAc), N-methyl-2-pyrrolidone (NMP), dimethylformamide (DMF), dimethylsulfoxide (DMSO), ethylcellosolve, methylcellosolve, acetone, ethylacetate, m-cresol, and the like.

More specifically, the fluorine-based aromatic diamine and the aromatic diacid dichloride are reacted to prepare an intermediate in the form of an oligomer including an amide unit, and then the oligomer is reacted with the fluorine-based aromatic diamine, the aromatic dianhydride, and the cycloaliphatic dianhydride to prepare a polyamic acid solution, thereby preparing a polyamideimide-based film in which the amide intermediate is uniformly distributed. As such, the amide intermediate is uniformly distributed in the entire film, whereby mechanical properties are excellent, optical properties are excellent, and coatability and coating uniformity of a coating composition used in a post-coating process of the hard coating layer or the like are further improved on the entire area of the film to further improve the optical physical properties of the final window cover film, and thus, a film having excellent optical properties without occurrence of an optical stain such as rainbow and mura may be provided.

Next, the step of imidizing to prepare a polyamideimide resin may be performed by chemical imidization, and more preferably, a polyamic acid solution is chemically imidized using pyridine and an acetic anhydride. Subsequently, imidization is performed using an imidization catalyst and a dehydrating agent at a low temperature of 150° C. or lower, preferably 100° C. or lower, and more preferably 50 to 150° C.

By the method as such, uniform mechanical physical properties may be imparted to the entire film as compared with the case of an imidization reaction by heat at a high temperature.

As the imidization catalyst, any one or two or more selected from pyridine, isoquinoline, and β-quinoline may be used. In addition, as the dehydrating agent, any one or two or more selected from an acetic anhydride, a phthalic anhydride, a maleic anhydride, and the like may be used, but is not necessarily limited thereto.

In addition, an additive such as a flame retardant, an adhesion improver, inorganic particles, an antioxidant, a UV inhibitor, and a plasticizer may be mixed with the polyamic acid solution to prepare the polyamideimide resin.

In addition, after imidization, the resin is purified using a solvent to obtain a solid content, which is dissolved in a solvent to obtain a polyamideimide solution. The solvent may include N,N-dimethyl acetamide (DMAc) and the like, but is not limited thereto.

The step of forming a film from the polyamideimide solution is performed by applying the polyamideimide solution on a substrate, and then drying the solution in a drying step divided into a dry area. In addition, stretching may be performed before or after the drying, and a heat treatment step may be further performed after the drying or stretching step. As the substrate, for example, glass, stainless, a film, or the like may be used, but is not limited thereto. Application may be performed by a die coater, an air knife, a reverse roll, spraying, a blade, casting, gravure, spin coating, and the like.

<Hard Coating Layer>

Hereinafter, the hard coating layer will be described.

In an exemplary embodiment of the present invention, the hard coating layer may be placed on at least one surface of the transparent film (substrate layer). For example, the hard coating layer may be placed on one surface of the substrate layer or each may be placed on both surfaces of the substrate layer. The hard coating layer may protect the substrate layer having excellent optical and mechanical properties from external physical and chemical damage, and also has a function of maintaining or improving the optical properties while preventing creasing due to repeated deformation of the present invention.

In the present exemplary embodiment, the hard coating layer may have a thickness of 1 to 50% of the entire thickness of the window cover film, but is not limited thereto. Specifically, the hard coating layer may maintain optical properties while having excellent hardness. The hard coating layer may have a thickness of 1 to 50 μm, and more preferably 1 to 30 μm. When the thickness is within the range, a cured layer maintains flexibility while having excellent hardness, so that substantially no crease may occur.

In addition, the hard coating layer may have a pencil hardness of 2H or more, 3H or more, or 4H or more, may have no scratch at 10 times/1 Kgf, 20 times/1 Kgf, or 30 times/1 Kgf in scratch evaluation using steel wool (#0000, from Reveron), and may have a water contact angle of 80° or more, 90° or more, or 100° or more.

In the present exemplary embodiment, the hard coating layer may include a silsesquioxane-based compound as a main component. More specifically, the silsesquioxane compound may be an epoxidized cycloalkyl substituted silsesquioxane-based compound.

Here, the silsesquioxane-based compound may have a weight average molecular weight of 1,000 to 20,000 g/mol. When the weight average molecular weight is within the above range, the composition for forming a hard coating layer may have an appropriate viscosity. Thus, wettability, coatability, curing reactivity, and the like of the composition for forming a hard coating layer may be further improved. Further, the hardness of the hard coating layer may be improved. Also, the flexibility of the hard coating layer may be improved to suppress creasing.

Preferably, the silsesquioxane-based compound may have a weight average molecular weight of 1,000 to 18,000 g/mol, and more preferably 2,000 to 15,000 g/mol. The weight average molecular weight is measured using GPC.

The silsesquioxane-based compound includes, for example, a repeating unit derived from a trialkoxysilane compound represented by the following Chemical Formula 1:

[Chemical Formula 2]

wherein A is a C1 to C10 linear or branched alkyl group having epoxy substituted on a C3 to C7 alicyclic alkyl group, and R is independently a C1 to C3 alkyl group.

Here, the alkoxysilane compound may be one or more of 2-(3,4-epoxycycohexyl)ethyltrimethoxysilane, 2-(3,4-epoxycyclohexyl)ethyltriethoxysilane, and 3-glycidoxypropyltrimethoxysilane, but the present invention is not limited thereto.

In addition, in the present exemplary embodiment, the silsesquioxane-based compound may include a repeating unit derived from a trialkoxysilane compound represented by Chemical Formula 1 and a repeating unit derived from a diakoxysilane compound represented by Chemical Formula 2. In this case, the silsesquioxane-based compound may be prepared by mixing 0.1 to 100 parts by weight of a dialkoxysilane compound with respect to 100 parts by weight of a trialkoxysilane compound and performing condensation polymerization. In this case, though the cause may not be clearly described, the surface hardness is further increased, and the bending properties are simultaneously significantly increased, which is thus preferred. For the bending properties, the increased effect is larger as compared with the case with no alicyclic group.

[Chemical Formula 2]

wherein $R_a$ is a linear or branched alkyl group selected from C1 to C5, A is a C1 to C10 linear or branched alkyl group having epoxy substituted on a C3 to C7 alicyclic alkyl group, and R is independently a C1 to C3 alkyl group.

A specific example of the compound of Chemical Formula 2 may include 2-(3,4-epoxycyclohexyl)ethylmethyldimethoxysilane, 2-(3,4-epoxycyclohexyl)ethylpropyldimethoxysilane, 2-(3,4-epoxycyclohexyl)ethylmethyldiethoxysilane, 2-(3,4-epoxycyclohexyl)ethylmethyldiethoxysilane, and the like, but is not limited thereto, and the compound may be used alone or in combination of two or more.

In addition, the hard coating layer in the present exemplary embodiment may include an inorganic filler. As the inorganic filler, for example, metal oxides such as silica, alumina, and titanium oxide; hydroxides such as aluminum hydroxide, magnesium hydroxide, potassium hydroxide; metal particles such as gold, silver, bronze, nickel, and an alloy thereof; conductive particles such as carbon, carbon nanotubes, and fullerene; glass; ceramic; and the like may be used. Preferably, silica may be used in terms of compatibility with other components of the composition. These may be used alone or in combination of two or more.

In addition, the hard coating layer may further include a lubricant. The lubricant may improve winding efficiency, blocking resistance, wear resistance, scratch resistance, and the like. As the lubricant, waxes such as polyethylene wax, paraffin wax, synthetic wax, or montan wax; synthetic resins such as a silicone-based resin or a fluorine-based resin; and the like may be used. These may be used alone or in combination of two or more.

Hereinafter, a method of forming the hard coating layer will be described in detail.

The hard coating layer is formed by preparing a composition for forming a hard coating layer, and applying and curing the composition on a substrate layer.

In the present exemplary embodiment, the composition for forming a hard coating layer includes silsesquioxane, a crosslinking agent, and a photoinitiator.

In addition, an epoxy-based monomer, a photoinitiator and/or a thermal initiator, a solvent, a thermal curing agent, an inorganic filler, a lubricant, an antioxidant, a UV absorber, a photostabilizer, a thermal polymerization inhibitor, a leveling agent, a surfactant, an antifriction, an antifouling agent, and the like may be further included.

The crosslinking agent may form crosslinks with an epoxy siloxane-based resin to solidify the composition for forming a hard coating the cured layer and to improve the hardness of the hard coating layer.

For example, the crosslinking agent may include a compound represented by the following Chemical Formula 3. The crosslinking agent, which is an alicyclic epoxy compound identical to the epoxy unit having a structure of Chemical Formula 1 or Chemical Formula 2 described above, promotes crosslinking, maintains a refractive index of the hard coating layer not to cause a change in a viewing angle, may maintain the bending properties, and also does not damage transparency, which is thus preferred.

[Chemical Formula 3]

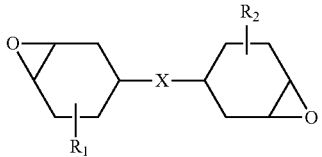

wherein $R_1$ and $R_2$ are independently of each other hydrogen or a linear or branched alkyl group having 1 to 5 carbon atoms, and X is a direct bond; a carbonyl group; a carbonate group; an ether group; a thioether group; an ester group; an amide group; a linear or branched alkylene group, an alkylidene group, or an alkoxylene group having 1 to 18 carbon atoms; a cycloalkylene group or a cycloalkylidene group having 1 to 6 carbon atoms; or a linking group thereof.

Here, a "direct bond" refers to a structure which is directly bonded without any functional group, and for example, in Chemical Formula 3, may refer to two cyclohexanes directly connected to each other. In addition, the "direct bond" refers to two or more substituents described above being connected to each other. In addition, in Chemical Formula 3, the substitution positions of $R_1$ and $R_2$ are not particularly limited, but when the carbon connected to X is set at position 1, and the carbons connected to an epoxy group are set at positions 3 and 4, it is preferred that $R_1$ and $R_2$ are substituted at position 6.

A content of the crosslinking agent is not particularly limited, and for example, may be 1 to 150 parts by weight, based on 100 parts by weight of the epoxy siloxane resin. When the content of the crosslinking agent is within the above range, the viscosity of the composition may be maintained in an appropriate range, and coatability and curing reactivity may be improved.

In addition, in the present exemplary embodiment, various epoxy compounds may be further used in the hard coating layer in addition to the compounds of the Chemical Formulae described above as long as the properties of the present invention are achieved, but it is preferred that the content does not exceed 20 parts by weight based on 100 parts by weight of the compound of Chemical Formula 2.

In the present exemplary embodiment, the epoxy-based monomer may be included at 10 to 80 parts by weight with respect to 100 parts by weight of the composition for forming a hard coating layer. Within the range of the content, viscosity may be adjusted, a thickness may be easily adjusted, a surface is uniform, defects in a thin film do not occur, and hardness may be sufficiently achieved, but the present invention is not limited thereto.

In the present exemplary embodiment, the photoinitiator is a cationic photoinitiator, and may initiate condensation of an epoxy-based monomer including the compounds of the above chemical formulae. As the cationic photoinitiator, for example, an onium salt and/or an organic metal salt, and the like may be used, but is not limited thereto. For example, a diaryliodonium salt, a triarylsulfonium salt, an aryldiazonium salt, an iron-arene complex, and the like may be used, and may be used alone or in combination of two or more.

A content of the photoinitiator is not particularly limited, and for example, may be 0.1 to 10 parts by weight, preferably 0.2 to 5 parts by weight with respect to 100 parts by weight of the compound of Chemical Formula 1.

In the present exemplary embodiment, a non-limiting example of the solvent may include alcohol-based solvents such as methanol, ethanol, isopropanol, butanol, methyl cellosolve, and ethyl cellosolve; ketone-based solvents such as methylethyl ketone, methylbutyl ketone, methylisobutyl ketone, diethyl ketone, dipropyl ketone, and cyclohexanone; hexane-based solvents such as hexane, heptane, and octane; benzene-based solvents such as benzene, toluene, and xylene; and the like. These may be used alone or in combination of two or more.

In the present exemplary embodiment, the solvent may be included at a residual amount excluding the amount of the remaining components in the total weight of the composition.

As an exemplary embodiment, the composition for forming a hard coating layer may further include a thermal curing agent. The thermal curing agent may include a sulfonium salt-based curing agent, an amine-based curing agent, an imidazole-based curing agent, an acid anhydride-based curing agent, an amide-based thermal curing agents, and the like, and it is more preferred to further use a sulfonium-based thermal curing agent in terms of discoloration prevention and high hardness implementation. These may be used alone or in combination of two or more. A content of the thermal curing agent is not particularly limited, and for example, may be 5 to 30 parts by weight, based on 100 parts by weight of the epoxy siloxane resin. When the content of the thermal curing agent is within the above range, hardness efficiency of the composition for forming a hard coating layer may be further improved to form a cured layer having excellent hardness.

In an exemplary embodiment of the present invention, by using the composition for forming a hard coating layer, the substrate layer may be physically protected, the mechanical physical properties may be further improved, and also the dynamic bending properties may be further improved. Specifically, a window cover film having no cracks even when bending is repeated 30,000 times or more, more specifically 30,000 times to 200,000 times, and more preferably 200,000 times or more in evaluation of the dynamic bending properties, may be provided.

In addition, various epoxy compounds may be further used in the hard coating layer of the present invention in addition to the compounds of the Chemical Formulae described above as long as the properties of the present invention are achieved, but it is preferred that the content does not exceed 20 parts by weight with respect to 100 parts by weight of the compound of Chemical Formula 1, for achieving the object of the present invention.

A method of polymerizing an alicyclic epoxidized silsesquioxane-based compound is not limited as long as it is known in the art, but for example, the compound may be prepared by hydrolysis and a condensation reaction between alkoxy silanes in the presence of water. The hydrolysis reaction may be promoted by including a component such as an inorganic acid. In addition, the epoxysilane-based resin may be formed by polymerizing a silane compound including an epoxycyclohexyl group.

In an exemplary embodiment of the present invention, the hard coating layer may be formed by applying and curing the composition for forming a hard coating layer described above on an upper surface or a lower surface of the substrate layer. The curing may be performed by thermal curing and/or photocuring, and a method known in the art may be used.

In an exemplary embodiment of the present invention, a plurality of substrate layers and a plurality of hard coating layers may be laminated. For example, a plurality of substrate layers and a plurality of hard coating layers may be alternately laminated. In addition, the hard coating layer may be placed on both surfaces of the substrate layer, respectively.

In addition, in an exemplary embodiment of the present invention, various coating layers may be further formed depending on its use, as a layer for imparting functionality of the window cover film in addition to the hard coating layer. Specifically, for example, the coating layer may include any one or more layers selected from a restoration layer, an impact spread layer, a self-cleaning layer, an anti-fingerprint layer, an anti-scratch layer, a low-refractive layer, an impact absorption layer, and the like, but is not limited thereto.

Even in the case in which various coating layers as described above are formed on the polyimide-based film, a window cover film having excellent display quality, high optical properties, and a significantly reduced rainbow phenomenon, may be provided.

<Flexible Display Panel>

In an exemplary embodiment of the present invention, a flexible display panel or a flexible display device including the window cover film according to the exemplary embodiment may be provided.

In an exemplary embodiment of the present invention, the display device is not particularly limited as long as it belongs to a field requiring excellent optical properties, and may be provided by selecting a display panel appropriate therefor. Preferably, the window cover film may be applied to a flexible display device, and specifically, for example, may be included and applied to any one or more image displays selected from various image displays such as a liquid crystal display, an electroluminescence display, a plasma display, and a field emission display device, but is not limited thereto.

The display device including the window cover film of the present invention described above has excellent display quality to be displayed and significantly decreased distortion caused by light, and thus, may have a significantly improved rainbow phenomenon in which iridescent stains occur and minimize a user's eye strain with excellent visibility.

Hereinafter, the present invention will be described in more detail with reference to the Examples and Comparative Examples. However, the following Examples and Comparative Examples are only an example for describing the present invention in detail, and do not limit the present invention in any way.

Hereinafter, the physical properties were measured as follows:

1) Pencil Hardness

According to JIS K 5400, a line of 20 mm was drawn at a rate of 50 mm/sec on a film using a load of 750 g, this operation was repeated 5 times or more, and the pencil hardness was measured based on the case in which one or more scratches occurred.

2) Elongation at Break

According to ASTM D882, the elongation at break was measured using UTM 3365 available from Instron, with the condition of pulling a polyamideimide film having a length of 50 mm and a width of 10 mm at 50 mm/min at 25° C.

The thickness of the film was measured and the value was input to the instrument. The unit of the elongation at break was %.

3) Light Transmittance

In accordance with the standard of ASTM D1746, a total light transmittance was measured at the entire wavelength area of 400 to 700 nm using a spectrophotometer (from Nippon Denshoku, COH-400) and a single wavelength light transmittance was measured at 388 nm using UV/Vis (Shimadzu, UV3600), on a film having a thickness of 50 μm. The unit was %.

4) Haze

In accordance with the standard of ASTM D1003, the haze was measured based on a film having a thickness of 50 μm, using a spectrophotometer (from Nippon Denshoku, COH-400). The unit was %.

5) Yellowness (YI) and b* Value

In accordance with the standard of ASTM E313, the yellowness and the b* value were measured based on a film having a thickness of 50 μm, using a colorimeter (from HunterLab, ColorQuest XE).

6) Weight Average Molecular Weight (Mw) and Polydispersity Index (PDI)

The weight average molecular weight and the polydispersity index of the prepared film were measured by dissolving a film sample in a DMAc eluent containing 0.05 M LiBr and using GPC (Waters GPC system, Waters 1515 isocratic HPLC Pump, Waters 2414 Refractive Index detector). During measurement, as a GPC column, Olexis, Polypore, and mixed D columns were connected, as a solvent, a DMAc solution was used, as a standard, polymethylmethacrylate (PMMA STD) was used, and the analysis was performed at 35° C. at a flow rate of 1 mL/min.

7) Dynamic Bending Properties

Figure 3:
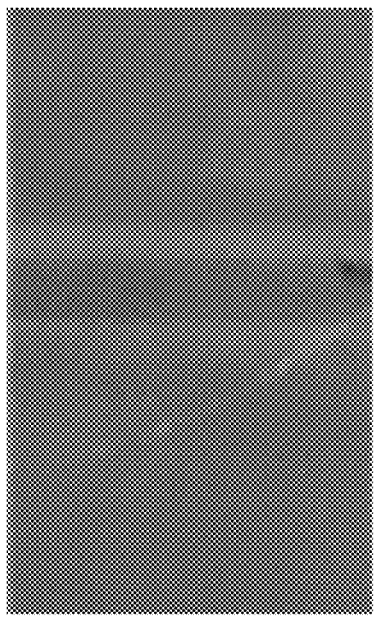
FIG. 3 is a photograph showing that cracks did not occur when measuring dynamic bending.
Figure 4:
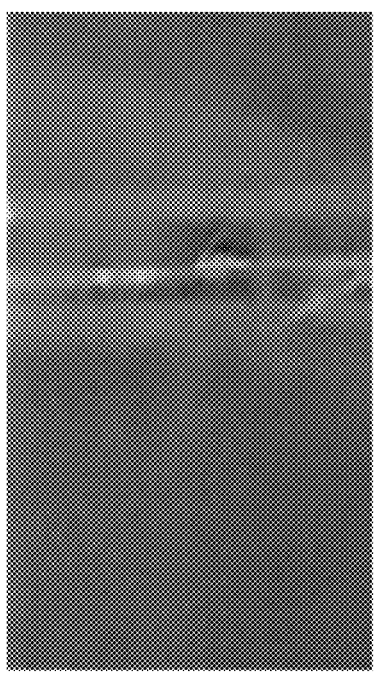
FIG. 4 is a photograph showing that cracks occurred when measuring dynamic bending.

A hard coating film was cut into a size of a width of 100 mm and a length of 200 mm by laser and fixed to a folding tester (from YUASA) using an adhesive agent, a folding radius ($R_1$ of FIG. 1) was set at 5 mm, an infolding test (an inside of a coating surface, see FIG. 1) was performed 30,000, 100,000, 150,000, 180,000, and 200,000 times repeatedly at a rate of 60 cycles/min, an outfolding test (the opposite side, see FIG. 2) was performed on the same sample at the same number of times at the same rate so that the sample was folded at the same position (P), and the cracks in the folded part were visually observed. Fine cracks were observed by a microscope. FIG. 3 is a photograph illustrating that cracks did not occur, and FIG. 4 is a photograph illustrating that cracks occurred.

8) Micro Flexural Modulus and Micro Flexural Strength

A micro 3-point bend fixture (Instron, CAT. #2810-411) was used for measuring the flexural strength due to fine deformation of a thin film. A sample was placed on two lower anvils and then a load was applied to one upper anvil. Here, the used anvil had radius of 0.25 mm. The loading was applied precisely to a span center between the two lower anvils. In the experiment, a supported span of the lower anvil was 4 mm.

Here, the size of the sample was prepared to have a width of 10 mm and a length of 20 mm. A test was performed by mounting a static load cell (CAT #2530-50N) of 50 N on a single column tabletop testing system (CAT #5942) from Instron, applying a preload of 0.2 N at a rate of 1 mm/min, and then pressing at a rate of 1 mm/min until a flexural strain of 2% is achieved. A pressed circular cross section had a diameter of 3 mm. An exact flexural displacement was precisely measured using Advanced Video Extensometer 2 (AVE 2, CAT #2663-901) from Instron. AVE 2 tracked deformation of the part indicated in the sample using a built-in camera in a non-contacting optical extensometer.

Finally, a stress applied until a flexural strain of 2% was achieved was measured in 100 ms increments to determine the micro flexural strength and the micro flexural modulus (@ 2% strain). The micro flexural modulus, strength, and strain are values calculated based on an input program in Testing System from Instron.

[Preparation Example 1] Preparation of Composition for Forming Hard Coating Layer 2-(3,4-Epoxycyclohexyl)ethyltrimethoxysilane (ECTMS, from TCI) and water was mixed at a ratio of 24.64 g:2.70 g (0.1 mol:0.15 mol) to prepare a reaction solution and the reaction solution was added to a 250 mL 2-neck flask. 0.1 mL of a tetramethylammonium hydroxide catalyst (from Aldrich) and 100 mL of tetrahydrofuran (from Aldrich) were added to the mixture and stirring was performed at 25° C. for 36 hours. Then, layer separation was performed and a product layer was extracted with methylene chloride (Aldrich), moisture was removed from the extract with magnesium sulfate (Aldrich), and the solvent was dried under vacuum to obtain an epoxy siloxane-based resin. As a result of measuring an epoxy siloxane-based resin using gel permeation chromatography (GPC), a weight average molecular weight was 2,500 g/mol.

A composition in which 30 g of the epoxy siloxane-based resin as prepared above, 10 g of (3',4'-epoxycyclohexyl) methyl 3,4-epoxycyclohexanecarboxylate and 5 g of bis[(3,4-epoxycyclohexyl)methyl] adipate as a crosslinking agent, 0.5 g of (4-methylphenyl)[4-(2-methylpropyl)phenyl]iodoniumhexafluorophosphate as a photoinitiator, and 54.5 g of methylethyl ketone were mixed was prepared.

[Preparation Example 2] Preparation of Composition for Forming Hard Coating Layer The process was performed in the same manner as in Preparation Example 1, except that a monomer in which 20 g of 2-(3,4-epoxycyclohexyl)ethyltrimethoxysilane and 4.64 g of 2-(3,4-epoxycyclohexyl)dimethyldimethoxysilane were mixed was used and the weight average molecular weight was 2,600 g/mon.

EXAMPLE 1

1) Preparation of Transparent Film

Terephthaloyl dichloride (TPC) and 2,2'-bis(trifluoromethyl)-benzidine (TFMB) were added to a mixed solution of dichloromethane and pyridine in a reactor, and stirring was performed at 25° C. for 2 hours under a nitrogen atmosphere. Here, a mole ratio of TPC:TFMB was 300:400, and adjustment was performed so that a solid content was 10 wt %. Thereafter, the reactant was precipitated in an excessive amount of methanol and filtered to obtain a solid content, which was dried under vacuum at 50° C. for 6 hours or more to obtain an oligomer, and the prepared oligomer had a formula weight (FW) of 1670 g/mol.

N,N-dimethylacetamide (DMAc), 100 mol of the oligomer, and 28.6 mol of 2,2'-bis(trifluoromethyl)-benzidine (TFMB) were added to the reactor and sufficient stirring was performed. After confirming that the solid raw material was completely dissolved, fumed silica (surface area of 95 $m^2$/g, <1 μm) was added to DMAc at a content of 1000 ppm relative to the solid content, and added to the reactor after being dispersed using ultrasonic waves. 64.1 mol of cyclobutanetetracarboxylic dianhydride (CBDA) and 64.1 mol of 4,4'-hexafluoroisopropylidene diphthalic anhydride (6FDA) were subsequently added, sufficient stirring was performed, and the mixture was polymerized at 40° C. for 10 hours. Here, the solid content was 20%. Subsequently, each of pyridine and acetic anhydride was added at 2.5-fold relative to the total content of dianhydride, and stirring was performed at 60° C. for 12 hours.

After the polymerization was finished, the polymerization solution was precipitated in an excessive amount of methanol and filtered to obtain a solid content, which was dried under vacuum at 50° C. for 6 hours to obtain polyamideimide powder. The powder was diluted and dissolved at 20% in DMAc to prepare a polyimide-based resin solution.

The polyimide-based resin solution was applied on a glass substrate using an applicator, dried at 80° C. for 30 minutes and 100° C. for 1 hour, and cooled to room temperature to prepare a film. Thereafter, stepwise heat treatment was performed at a heating rate of 20° C./min at 100 to 200° C. and 250 to 300° C. for 2 hours.

The thus-prepared polyamideimide film had the thickness of 50 μm, the transmittance at 388 nm of 15%, the total light transmittance of 89.73%, the haze of 0.4%, a yellowness (YI) of 1.9, the b* value of 1.0, the elongation at break of 21.2%, the weight average molecular weight of 310,000 g/mol, the polydispersity index (PDI) of 2.11, and the pencil hardness of HB.

In addition, it was confirmed that the micro flexural modulus was 16 GPa and the micro flexural strength was 220 MPa.

2) Formation of Hard Coating Layer

Next, the composition for forming a hard coating layer prepared in Preparation Example 1 was applied on one surface of the prepared polyamideimide film having a thickness of 50 μm on the substrate film using a Meyer bar and dried at 60° C. for 5 minutes, UV was irradiated at 1 J/cm² using a high-pressure metal lamp, and the composition was cured at 120° C. for 15 minutes to prepare a window cover film on which the hard coating layer having a thickness of 10 μm was formed.

It was confirmed that the thus-prepared window cover film had the micro flexural modulus of 24.8 GPa and the micro flexural strength of 293 MPa, and the results of measuring the dynamic bending properties are shown in Tables 1 and 2.

EXAMPLE 2

The process was performed in the same manner as in Example 1, except that the composition for forming a hard coating layer prepared in Preparation Example 2 was used instead of the composition for forming a hard coating layer prepared in Preparation Example 1.

It was confirmed that the thus-prepared window cover film had the micro flexural modulus of 27.1 GPa and the micro flexural strength of 307 MPa, and the results of measuring the dynamic bending properties are shown in Tables 1 and 2.

EXAMPLE 3

Terephthaloyl dichloride (TPC) and 2,2'-bis(trifluoromethyl)-benzidine (TFMB) were added to a mixed solution of dichloromethane and pyridine in a reactor, and stirring was performed at 25° C. for 2 hours under a nitrogen atmosphere. Here, a mole ratio of TPC:TFMB was 300:400, and adjustment was performed so that a solid content was 10 wt %. Thereafter, the reactant was precipitated in an excessive amount of methanol and filtered to obtain a solid content, which was dried under vacuum at 50° C. for 6 hours or more to obtain an oligomer, and the prepared oligomer had a formula weight (FW) of 1670 g/mol.

N,N-dimethylacetamide (DMAc), 100 mol of the oligomer, and 50 mol of 2,2'-bis(trifluoromethyl)-benzidine (TFMB) were added to the reactor and sufficient stirring was performed. After confirming that the solid raw material was completely dissolved, fumed silica (surface area of 95 m²/g, <1 μm) was added to DMAc at a content of 1000 ppm relative to the solid content, and added to the reactor after being dispersed using ultrasonic waves.

50 mol of 4,4'-hexafluoroisopropylidene diphthalic anhydride (6FDA) and 50 mol of biphenyltetracarboxylic dianhydride (BPDA) were added and stirring was performed until the materials were dissolved, and then 50 mol of cyclobutanetetracarboxylic dianhydride (CBDA) was added and stirring was performed until the material was dissolved.

Subsequently, each of pyridine and acetic anhydride was added at 2.5-fold relative to the total added amount of dianhydride, and stirring was performed at 60° C. for 12 hours.

After the polymerization was finished, the polymerization solution was precipitated in an excessive amount of methanol and filtered to obtain a solid content, which was dried under vacuum at 50° C. for 6 hours to obtain polyamideimide powder. The powder was diluted and dissolved at 20% in DMAc to prepare a polyimide-based resin solution.

The polyimide-based resin solution was applied on a glass substrate using an applicator, dried at 80° C. for 30 minutes and 100° C. for 1 hour, and cooled to room temperature to prepare a film. Thereafter, stepwise heat treatment was performed at a heating rate of 20° C./min at 100 to 200° C. and 250 to 300° C. for 2 hours.

As a result of measuring the physical properties of the thus-prepared polyamideimide film, the thickness was 50 μm, the total light transmittance was 89.2%, the haze was 0.5%, a yellowness (YI) was 2.6, the b* value was 1.5, the elongation at break was 19.2%, the weight average molecular weight was 205,000 g/mol, the polydispersity index (PDI) was 2.11, and the pencil hardness was HB/750 g.

In addition, it was confirmed that the micro flexural modulus was 10 GPa and the micro flexural strength was 180 MPa.

2) Formation of Hard Coating Layer

Next, the composition for forming a hard coating layer prepared in Preparation Example 1 was applied on one surface of the prepared polyamideimide film having a thickness of 50 μm on the substrate film using a Meyer bar and dried at 60° C. for 5 minutes, UV was irradiated at 1 J/cm² using a high-pressure metal lamp, and the composition was cured at 120° C. for 15 minutes to prepare a window cover film on which the hard coating layer having a thickness of 10 μm was formed.

It was confirmed that the thus-prepared window cover film had the micro flexural modulus of 20.3 GPa and the micro flexural strength of 269 MPa, and the results of measuring the dynamic bending properties are shown in Tables 1 and 2.

COMPARATIVE EXAMPLE 1

1) Preparation of Transparent Film 100 parts by weight of N,N-dimethylacetamide (DMAc) and 2,2'-bis(trifluoromethyl)-benzidine (TFMB) were added to a reactor under a nitrogen atmosphere, sufficient stirring was performed, 30 parts by weight of 4,4'-hexafluoroisopropylidene diphthalic anhydride (6FDA) was added thereto, and sufficient stirring was performed until the material was dissolved.

Thereafter, 30 parts by weight of 3,3',4,4'-biphenyltetracarboxyldianhydride (BPDA) was added and stirring was performed until the material was dissolved. Thereafter, 40 parts by weight of terephthaloyl dichloride (TPC) was introduced and stirring was performed for 6 hours to carry out dissolution and reaction, thereby producing a polyamic acid resin composition. Each monomer was adjusted to have a solid content of 6.5 wt %. Each of Pyridine and acetic anhydride was subsequently added to the composition at 2.5-fold of the total moles of dianhydride, and stirring was performed at 60° C. for 1 hour. Thereafter, the solution was precipitated in an excessive amount of methanol and the precipitate was filtered to obtain a solid content, which was dried under vacuum at 50° C. for 6 hours to obtain polyamideimide powder. The powder was diluted and dissolved at 20 wt % in DMAc to prepare a composition for forming a substrate layer.

A film was prepared from the composition for forming a substrate layer under the same conditions as Example 1. The film had a thickness of 50 μm. As a result of measuring the physical properties of the prepared film, the total light transmittance was 87.03%, the haze was 0.67%, the yellowness (YI) was 2.6, and the b* value was 1.55. In addition, it was confirmed that the micro flexural modulus was 9.5 GPa and the micro flexural strength was 148 MPa.

2) Formation of Hard Coating Layer

Next, the composition for forming a hard coating layer prepared in Preparation Example 1 was applied on one surface of the prepared transparent film having a thickness of 50 pm on the substrate film using a Meyer bar and dried at 60° C. for 5 minutes, UV was irradiated at 1 J/cm² using a high-pressure metal lamp, and the composition was cured at 120° C. for 15 minutes to prepare a window cover film on which the hard coating layer having a thickness of 10 μm was formed.

It was confirmed that the thus-prepared window cover film had the micro flexural modulus of 14.5 GPa and the micro flexural strength of 190 MPa, and the results of measuring the dynamic bending properties are shown in Tables 1 and 2.

TABLE 1

| | Pencil hardness | Cracks | | | | |
|---|---|---|---|---|---|---|
| | | 30,000 times | 100,000 times | 150,000 times | 180,000 times | 200,000 times |
| Example 1 | 4H | X | X | X | X | ○ |
| Example 2 | 5H | X | X | X | X | X |
| Example 3 | 4H | X | X | ○ | ○ | ○ |
| Comparative Example 1 | 4H | ○ | ○ | ○ | ○ | ○ |

TABLE 2

| | Micro flexural modulus (GPa) | | Micro flexural strength (MPa) | | | | |
|---|---|---|---|---|---|---|---|
| | Before hard coating | After hard coating | Before hard coating | After hard coating | A/B | \| Mh − Mf \| | \| Sh − Sf \| |
| Example 1 | 16 | 24.8 | 220 | 293 | 0.65 | 10 | 82.3 |
| Example 2 | 16 | 27.1 | 220 | 307 | 0.88 | 12.3 | 96.3 |
| Example 3 | 10 | 20.3 | 180 | 269 | 0.72 | 4.5 | 56.2 |
| Comparative Example 1 | 9.5 | 14.5 | 148 | 190 | 0.53 | 0.16 | 18.7 |

In Table 1, Mh is a micro flexural modulus measured when a hard coating layer surface faces upward, and Mf is a micro flexural modulus measured when a transparent film surface faces upward. Sh is a micro flexural strength measured when a hard coating layer surface faces upward Sf is a micro flexural strength measured when a transparent film surface faces upward. A is a flexural stress value (MPa) when a flexural strain is 1%, and B is a flexural stress value (MPa) when a flexural strain is 2%.

As seen from Table 1, it was found that the products prepared in the Examples were confirmed to have no fine cracks even after the dynamic bending evaluation of 100,000 times, and it was confirmed that by supplying the product having no cracks even in the evaluation of 100,000 times, a cover window having an excellent bending property durability may be manufactured.

Since the window cover film of the present invention has excellent bending properties, the window cover film has no permanent deformation and/or damage even when predetermined deformation occurs repeatedly and may be restored to its original form.

Accordingly, the window cover film may be applied to a display having a curved shape, a foldable device, or the like.

The window cover film of the present invention may provide a window cover film which may be applied to a flexible display device capable of both infolding and outfolding at a specific position.

The window cover film of the present invention has a hard coating layer for preventing scratches formed, and is flexible and foldable in spite of the hard coating layer formed and has no crease even during long-term use following folding, and thus, may provide a novel window cover film having excellent visibility.

The window cover film of the present invention has a high surface hardness, is flexible, has excellent bending properties, has no permanent deformation and/or damage in the hard coating layer and the window cover film even when predetermined deformation occurs repeatedly, and also has excellent restoration properties. Accordingly, a window cover film which may be applied to a display having a curved shape, a foldable device, or the like, may be provided.

In addition, the window cover film of the present invention may secure physical and chemical stability even under high temperature and high humidity conditions.

In addition, the window cover film according to an exemplary embodiment of the present invention may further improve the flexibility and the mechanical strength of the window cover film.

Hereinabove, although the present invention has been described by specific matters, limited exemplary embodiments, and drawings, they have been provided only for assisting the entire understanding of the present invention, and the present invention is not limited to the exemplary embodiments, and various modifications and changes may be made by those skilled in the art to which the present invention pertains from the description.

Therefore, the spirit of the present invention should not be limited to the above-described exemplary embodiments, and the following claims as well as all modified equally or equivalently to the claims are intended to fall within the scope and spirit of the invention.

What is claimed is:

1. A window cover film comprising a transparent film and a hard coating layer formed on one surface of the transparent film, the window cover film having a micro flexural modulus of 15 to 40 GPa and a micro flexural strength of 200 MPa or more, wherein
    the micro flexural modulus and the micro flexural strength refer to a modulus of elasticity and a strength measured as follows: a film having a width of 10 mm, a length of 20 mm and a thickness of 20 to 100 μm is placed between a lower anvil and an upper anvil of a micro 3-point bend fixture including two lower anvils spaced at an interval of 4 mm and one upper anvil having a radius of 0.25 mm, a preload of 0.2 N is applied at a rate of 1 mm/min using a load cell of 50 N, and then the film is pressed at a rate of 1 mm/min until a flexural strain of 2% is achieved, the modulus of elasticity and the strength being measured from a stress applied thereto, wherein the transparent film is a polyimide-based film having a block polyamideimide structure comprising a fluorine atom and an aliphatic cyclic ring structure, and wherein the hard coating layer includes an alicyclic epoxidized silsesquioxane-based compound.

2. The window cover film of claim 1, wherein the window cover film satisfies the following Relation 1:

$$2 \leq |Mh - Mf| \leq 15 \quad \text{[Relation 1]}$$

wherein Mh is a micro flexural modulus measured when a hard coating layer surface faces upward, and Mf is a micro flexural modulus measured when a transparent film surface faces upward.

3. The window cover film of claim 1, wherein the window cover film satisfies the following Relation 2:

$$20 \leq |Sh - Sf| \leq 150 \quad \text{[Relation 2]}$$

wherein Sh is a micro flexural strength measured when a hard coating layer surface faces upward, and Sf is a micro flexural strength measured when a transparent film surface faces upward.

4. The window cover film of claim 1, wherein a flexural displacement is 0.5 to 0.7 mm, the flexural displacement referring to a displacement measured when a flexural strain of 2% is achieved.

5. The window cover film of claim 1, wherein the window cover film satisfies the following relation:

$$0.6 < A/B < 0.9$$

wherein A is a flexural stress value (MPa) when a flexural strain is 1%, and B is a flexural stress value (MPa) when a flexural strain is 2%.

6. The window cover film of claim 1, wherein the window cover film has a light transmittance of 3% or more as measured at 388 nm according to ASTM D1746, a total light transmittance of 87% or more as measured at 400 to 700 nm, a haze according to ASTM D1003 of 1.5% or less, a yellowness according to ASTM E313 of 4.0 or less, and a b value of 2.0 or less.

7. The window cover film of claim 1, wherein the polyimide-based film includes a unit derived from a fluorine-based aromatic diamine, a unit derived from an aromatic dianhydride, a unit derived from an aromatic diacid dichloride, and a unit derived from a cycloaliphatic dianhydride.

8. The window cover film of claim 1, wherein the polyimide-based film has an elongation at break according to ASTM D882 of 8% or more.

9. The window cover film of claim 1, wherein the polyimide-based film has the light transmittance of 3% or more as measured at 388 nm according to ASTM D1746, the total light transmittance of 87% or more as measured at 400 to 700 nm, the haze of 2.0% or less, the yellowness of 5.0 or less, and the b* value of 2.0 or less.

10. The window cover film of claim 1, wherein the transparent film has a thickness of 10 to 500 μm and the hard coating layer has a thickness of 1 to 50 μm.

11. The window cover film of claim 1, wherein the hard coating layer has a pencil hardness of 4H or more.

12. A flexible display panel comprising the window cover film of claim 1.

* * * * *